United States Patent Office 3,342,603
Patented Sept. 19, 1967

3,342,603
NON-SILVER PHOTOSENSITIVE PRINTOUT COMPOSITIONS
Robert H. Sprague, Chagrin Falls, and John A. Stewart, Parma, Ohio, assignors to Horizons Incorporated, a corporation of New Jersey
No Drawing. Filed Sept. 28, 1964, Ser. No. 399,859
12 Claims. (Cl. 96—90)

ABSTRACT OF THE DISCLOSURE

Non-silver compositions which printout a visible image directly as a result of exposure to visible light and containing at least one dye base and at least one of each of two different classes of activator compounds in amounts which diminish the fog level and increase the maximum density of the dye image which prints out directly upon exposure of the film, the classes of activators being organic halogen compounds and organic sulfur compounds.

This invention relates to an improvement of photosensitive compositions of the type described in United States Patent 3,102,810 issued on Sept. 3, 1963. More particularly, it relates to the addition of a colorless non-toxic organic sulfur compound to such compositions for the purpose of diminishing the fog level and increasing the maximum density of the dye image in the exposed film.

The compositions described in the aforesaid United States patent consist essentially of an organic halogen compound and a dye base which may be either a styryl dye base of a cyanine dye base. The description of this patent is incorporated herein by reference, it being noted that in addition to the specific organic halogen compounds described in said patent, compounds in which the trihalogen substituted carbon is attached to an aroyl nucleus and compounds in which either chlorine or bromine, or mixtures of chlorine and bromine are the substituents on the trisubstituted carbon may be used.

Consequently the organic halogen compounds which are suitable in the photosensitive compositions of the present invention are those represented by the general formula A—C—$X_3$ wherein A represents a monovalent radical selected from the group consisting of alkyl, aryl, aroyl, aralkyl, haloalkyl, H, Cl, and Br; and each X is a halogen atom selected from the group consisting of Cl and Br.

The styryl dye bases which are useful in the present invention are those represented by

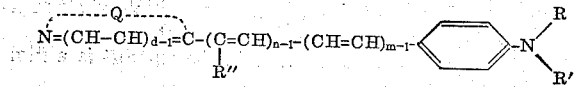

wherein R and R′ represent monovalent radicals selected from the group consisting of lower alkyl (i.e. methyl, ethyl, n-propyl) and benzyl, and may be the same as one another or different from one another; R″ represents a monovalent radical selected from the group consisting of H and —CN; d and n each represents a positive integer which is either 1 or 2; m is a positive integer not greater than 4; and the sum of n—1 and m—1 is not greater than 4; and Q represents the nonmetallic atoms necessary to complete a heterocyclic nucleus (i.e. the atoms of C, O, S, Se and N) necessary to complete heterocyclic compounds such as those listed in United States Patent 3,102,810.

The cyanine dye bases which are useful in the present invention are those represented by the following general formulas:

(I)

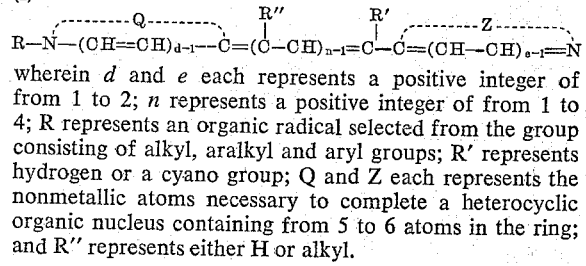

wherein d and e each represents a positive integer of from 1 to 2; n represents a positive integer of from 1 to 4; R represents an organic radical selected from the group consisting of alkyl, aralkyl and aryl groups; R′ represents hydrogen or a cyano group; Q and Z each represents the nonmetallic atoms necessary to complete a heterocyclic organic nucleus containing from 5 to 6 atoms in the ring; and R″ represents either H or alkyl.

(II)

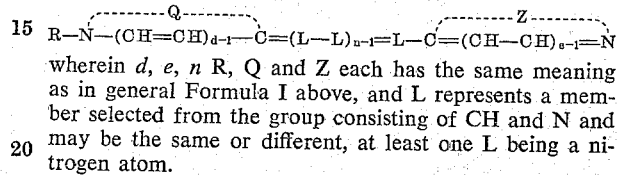

wherein d, e, n R, Q and Z each has the same meaning as in general Formula I above, and L represents a member selected from the group consisting of CH and N and may be the same or different, at least one L being a nitrogen atom.

(III)

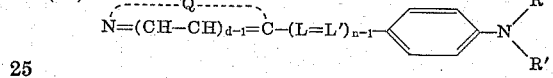

wherein R and R′ represent alkyl or benzyl and may be the same or different from one another, d represents either 1 or 2, n represents a positive integer from 1 to 4, L and L′ each represents a member selected from the group consisting of CH and N and may be the same or different, at least one of L and L′ being a nitrogen atom, and Q represents the nonmetallic atoms necessary to complete a heterocyclic nucleus.

Examples of suitable styryl dye bases and cyanine dye bases are set forth in United States Patent 3,102,810.

The third essential constituent in the photosensitive composition of the present invention is a colorless non-toxic sulfur compound selected from the group consisting of the following:

(a) Mercapto compounds represented by the formula R′—SH wherein R′ is a heterocyclic nucleus of the type commonly used in cyanine dye chemistry;

(b) Disulfides represented by the general formula R′—S—S—R′ wherein each R′ has the same meaning as in (a);

(c) Disulfides of the general formula

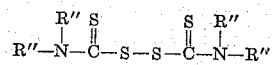

wherein R″ represents H, alkyl and aryl;

(d) Thiourea compounds;
(e) Acyclic thioacetanilides;
(f) Rhodanines.

A particularly preferred combination of activators consists of CBr₄ as the organic halogen compound and 2-mercaptobenzothiazole (MBT) as the organic sulfur compound.

The data reported in the table which follows is the result of tests establishing the effect of visible light on mixtures containing carbon tetrabromide as the sole activator compound used with the indicated dye bases and on mixtures in which both carbon tetrabromide and 2-mercaptobenzothiazole or rhodanine were used to activate the indicated dye bases.

To obtain the data, a binder mixtures was prepared consisting of equal parts by volume of benzene and a 10% solution of cellulose acetate butyrate in acetone, 2 cc. of each being used. Then the indicated weights of the dye base and of the activators were dissolved in the binder mixture. The binder was omitted from the last four compositions in the table. The resulting composition was coated by means of a Bird Applicator on Mylar polyethylene terephthalate (302–T) which had been pre-coated with a cellulose acetate butyrate sublayer in a coating having an 0.003 inch wet thickness and the coating was permitted to dry in air. Thereafter the composition was exposed to a photoflood lamp for 1 minute through a silver step tablet having superimposed strips of red, green, and blue filters. The number of steps visible and the difference between D-Max. and the density of the base plus fog are an indication of the photographic response of the composition.

| Formula No. | Dye Base | Mg. | Activator, mg. | | Base plus Fog | Densities | | | | | | | | | | | Image Hue |
|---|---|---|---|---|---|---|---|---|---|---|---|---|---|---|---|---|---|
| | | | | | | Clear | | | Red | | | Green | | | Blue | | |
| | | | $CBr_4$ | 2-MBT | | No. Steps | Gross | Net | No. Steps | Gross | Net | No. Steps | Gross | Net | No. Steps | Gross | Net | |
| 1 | 4-(3-methyl-2(3H)-benzothiazolylidene)-methyl quinoline. | 12.5 | 700 | | 1.31 | 9 | 1.99 | 0.59 | 0 | 1.31 | 0 | 2 | 1.69 | 0.38 | 2 | 1.61 | 0.30 | Yellow. |
| 2 | As in 1 above | 12.5 | 700 | 25 | 0.05 | 13 | 2.26 | 2.21 | 0 | 0.05 | 0 | 8 | 1.03 | 0.98 | 6 | 0.54 | 0.49 | Do. |
| 3 | 4-[3-(3-ethyl-2(3H)-benzothiazolylidene)-propenyl] quinoline. | 12.5 | 700 | | 0.17 | 21 | 0.81 | 0.64 | 18 | 0.75 | 0.58 | 14 | 0.76 | 0.59 | 12 | 0.61 | 0.44 | Blue. |
| 4 | As in 3 above | 12.5 | 700 | 25 | 0.08 | 21 | 2.45 | 2.37 | 15 | 1.71 | 1.63 | 12 | 1.40 | 1.32 | 9 | 0.96 | 0.88 | Do. |
| 5 | 2-[3-(3-ethyl-2(3H)-benzothiazolylidene)-propenyl] quinoline. | 25 | 700 | | 1.72 | 21 | 3+ | 1.28 | 21 | 2.65 | 0.93 | 21 | 2.90 | 1.18 | 11 | 2.90 | 1.18 | Purple. |
| 6 | As in 5 above | 25 | 700 | 25 | 0.06 | 21 | 3+ | 2.94 | 16 | 2.74 | 2.68 | 13 | 1.36 | 1.30 | 12 | 1.05 | 0.99 | Do. |
| 7 | 3-ethyl-5-[3-ethyl-2(3H)-benzothiazolylidene)ethylidene]-2-(2-quinolylmethylene)-4-thiazolidone. | 25 | 700 | | 0.08 | 11 | 1.70 | 1.62 | 8 | 1.35 | 1.27 | 6 | 0.46 | 0.38 | 2 | 0.18 | 0.10 | Very dark green. |
| 8 | As in 7 above | 25 | 700 | 25 | 0.12 | 21 | 2.55 | 2.43 | 8 | 2.42 | 2.30 | 12 | 1.23 | 1.11 | 10 | 0.80 | 0.68 | Black. |
| 9 | 4-(p-dimethylaminostyryl) quinoline. | 25 | 700 | | 0.04 | 16 | 0.83 | 0.79 | 4 | 0.27 | 0.23 | 10 | 0.40 | 0.36 | 8 | 0.24 | 0.20 | Red. |
| 10 | As in 9 above | 25 | 700 | 25 | 0.06 | 13 | 1.26 | 1.20 | 3 | 0.41 | 0.35 | 7 | 0.56 | 0.50 | 6 | 0.20 | 0.14 | Purple. |
| 11 | As in 3 above | 12.5 | 700 | ¹25 | 0.17 | 21 | 1.87 | 1.70 | 21 | 1.78 | 1.61 | 21 | 1.41 | 1.24 | 15 | 1.35 | 1.18 | Violet. |
| 12 | 4-[3-(3-ethyl-2(3H)-benzothiazolylidene)-propenyl]-quinoline. | 12.5 | 700 | ²25 | 0.12 | 21 | 2.00 | 1.88 | 18 | 1.98 | 1.86 | 15 | 2.00 | 1.88 | 13 | 1.47 | 1.35 | Purple. |

¹ Rhodanine.   ² Thiourea.

Useful proportions of dye base to activator are as follows: For each part by weight of dye base there should be between 0.5 and 5 parts by weight of the sulfur containing compound and for each part by weight of dye base there should be between 10 and 200 parts by weight of organic halogen compound.

When too much of either activator is present the film is subject to fogging and when too little is present the formation of the image requires an unduly long exposure. Preferred proportions are illustrated in the table.

Having now described the invention in accordance with the patent statutes, it is not intended that it be limited except as may be required by the appended claims.

We claim:
1. A composition which prints out a visible image directly as a result of exposure to visible light, said composition being an intimate mixture consisting essentially of
   (1) a dye base selected from the group consisting of styryl dye bases and cyanine dye bases; and
   (2) an activator for said dye base consisting of (a) at least one organic halogen compound represented by the general formula A—C—X₃ wherein A represents a monovalent radical selected from the group consisting of alkyl, aryl, aroyl, aralkyl, haloalkyl, H, Cl and Br and each X is a halogen atom selected from the group consisting of Cl and Br and (b) at least one colorless non-toxic sulfur-containing compound selected from the group consisting of the following:
      (a) mercapto compounds represented by the formula R′—SH wherein R′ is a heterocyclic nucleus of the type commonly used in cyanine dye chemistry;
      (b) disulfides represented by the general formula R′—S—S—R′ wherein each R′ has the same meaning as in (a);
      (c) disulfides of the general formula

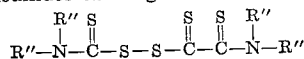

wherein R″ represents H, alkyl and aryl;
   (d) thiourea compounds;
   (e) acyclic thioacetanilides;
   (f) rhodanines 2. The composition of claim 1 wherein the relative proportions of organic halogen compound to dye base are between 10 and 200 parts by weight of organic halogen compound per part by weight of dye base.

3. The composition of claim 1 wherein the organic halogen compound is $CBr_4$.

4. The composition of claim 1 wherein the non-toxic colorless, sulfur-containing organic compound is a rhodanine represented by the formula

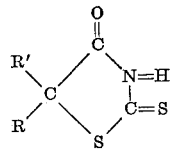

wherein R and R′ represent H, alkyl, aralkyl or aryl.

5. The composition of claim 1 wherein the mercapto group is attached to the number two carbon of a heterocyclic nucleus.

6. The composition of claim 6 wherein the compound is 2-mercaptobenzothiazole.

7. The composition of claim 1 wherein the styryl dye base is 4-p-dimethylaminostyryl quinoline.

8. The composition of claim 1 wherein the cyanine dye base is 4-[3-(3-ethyl-2(3H)-benzothiozolylidene) propenyl] quinoline.

9. A dry film consisting of the composition of claim 1 dispersed in a thin layer on an inert support.

10. The film of claim 9 wherein the support is a film forming plastic.

11. The film of claim 9 wherein the support is transparent.

12. The process of producing a direct print out image from originally colorless compounds which comprises preparing the composition of claim 1 in the form of a thin layer, exposing said layer to a pattern of visible light whereby a visible image prints out directly as a result of said exposure.

References Cited

UNITED STATES PATENTS 3,095,303   6/1963   Sprague et al. ———— 96–90
3,100,703   8/1963   Sprague et al. ———— 96–48

NORMAN G. TORCHIN, *Primary Examiner.*

C. E. DAVIS, *Assistant Examiner.*

UNITED STATES PATENT OFFICE
CERTIFICATE OF CORRECTION

Patent No. 3,342,603 September 19, 1967

Robert H. Sprague et al.

It is hereby certified that error appears in the above numbered patent requiring correction and that the said Letters Patent should read as corrected below.

Column 1, line 33, for "of", first occurrence, read -- or --; column 2, line 65, for "mixtures" read -- mixture --; column 3, lines 74 and 75, for the right-hand portion of the formula reading

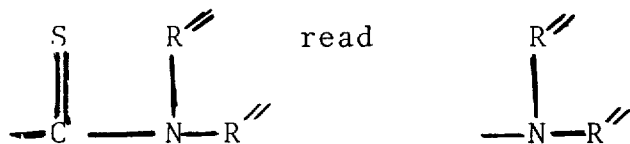

column 4, lines 39 to 44, for the right-hand portion of the formula reading

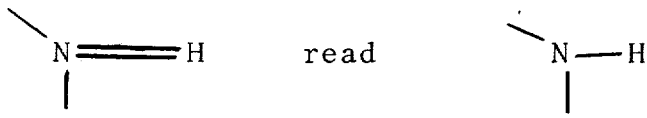

Signed and sealed this 15th day of October 1968.

(SEAL)
ATTEST:

EDWARD M. FLETCHER, JR.　　　　　　　　　　EDWARD J. BRENNER
Attesting Officer　　　　　　　　　　　　Commissioner of Patent